United States Patent
Delamarche et al.

(10) Patent No.: US 8,695,639 B2
(45) Date of Patent: Apr. 15, 2014

(54) MULTILAYER MICROFLUIDIC PROBE HEAD AND METHOD OF FABRICATION THEREOF

(75) Inventors: Emmanuel Delamarche, Rueschlikon (CH); Ute Drechsler, Rueschlikon (CH); Robert Lovchik, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 13/318,675

(22) PCT Filed: May 7, 2010

(86) PCT No.: PCT/IB2010/052018
§ 371 (c)(1),
(2), (4) Date: Nov. 3, 2011

(87) PCT Pub. No.: WO2010/128483
PCT Pub. Date: Nov. 11, 2010

(65) Prior Publication Data
US 2012/0048391 A1 Mar. 1, 2012

(30) Foreign Application Priority Data
May 7, 2009 (EP) .................................... 09159608

(51) Int. Cl.
*F15C 1/06* (2006.01)
(52) U.S. Cl.
USPC ........... 137/833; 137/884; 137/594; 137/559; 422/500; 422/502; 422/503
(58) Field of Classification Search
USPC ............ 137/833, 884, 594, 312, 559, 599.03; 422/500, 502, 503, 70; 118/256
See application file for complete search history.

(56) References Cited

U.S. PATENT DOCUMENTS 2,876,795 A * 3/1959 Diaz .............................. 137/594
3,495,604 A * 2/1970 Pierce ........................ 137/15.01
(Continued)

FOREIGN PATENT DOCUMENTS

| CN | 1585674 A | 2/2005 |
| CN | 1942590 A | 4/2007 |

(Continued)

OTHER PUBLICATIONS

Kit T. Rodolfa et al., "Nanoscale Pipetting for Controlled Chemistry in Small Arrayed Water Droplets Using a Double Barrel Pipet," Supplementary Information; 2006.

(Continued)

*Primary Examiner* — Eric Keasel
*Assistant Examiner* — Minh Le
(74) *Attorney, Agent, or Firm* — Cantor Colburn LLP

(57) ABSTRACT

A micro fluidic probe head includes a first layer, a second layer, and a first tubing port extending from an upper face of the first layer. The first layer has a first via, enabling fluid communication between the first port and a lower face of the first layer. The second layer includes a first aperture on a face, and a first microchannel enabling fluid communication between an upper face of the second layer, facing the lower face of the first layer, and the first aperture. The head enables fluid communication between the first via and the first microchannel. At least a portion of the first microchannel is a groove open on the upper face of the second layer, closed by a portion of a lower face of a layer of the head. The probe head further comprises a second tubing port, a second via, a second aperture and a second micro channel.

9 Claims, 10 Drawing Sheets

(56) References Cited

U.S. PATENT DOCUMENTS

| | | | | |
|---|---|---|---|---|
| 4,606,375 | A | * | 8/1986 | Hockaday ..................... 137/828 |
| 4,951,709 | A | * | 8/1990 | Kirkham ................... 137/561 A |
| 5,882,465 | A | | 3/1999 | McReynolds |
| 6,258,263 | B1 | * | 7/2001 | Henderson et al. ........ 210/198.2 |
| 6,748,978 | B2 | * | 6/2004 | Pezzuto et al. ................ 137/833 |
| 7,105,812 | B2 | * | 9/2006 | Zhao et al. .................... 250/288 |
| 7,250,139 | B2 | * | 7/2007 | Espinosa et al. ............. 422/503 |
| 7,790,109 | B2 | * | 9/2010 | Kim et al. .................... 422/68.1 |
| 7,923,124 | B2 | * | 4/2011 | Minegishi et al. ............ 428/596 |
| 7,939,032 | B2 | * | 5/2011 | Hanafusa et al. ............ 422/500 |
| 7,976,795 | B2 | * | 7/2011 | Zhou et al. .................... 422/505 |
| 7,993,608 | B2 | * | 8/2011 | Lee ............................... 422/546 |
| 8,062,612 | B2 | * | 11/2011 | McAvoy et al. .............. 422/537 |
| 8,202,496 | B2 | * | 6/2012 | Coiffic et al. ................. 422/527 |
| 8,210,119 | B2 | * | 7/2012 | Gale et al. ..................... 118/256 |
| 8,322,232 | B1 | * | 12/2012 | Mayeaux ................... 73/863.85 |
| 8,329,115 | B2 | * | 12/2012 | Han et al. ...................... 422/502 |
| 8,372,358 | B2 | * | 2/2013 | Groisman et al. ............ 422/544 |
| 2002/0023684 | A1 | * | 2/2002 | Chow ............................ 137/833 |
| 2003/0026740 | A1 | * | 2/2003 | Staats ........................... 422/102 |
| 2003/0099577 | A1 | | 5/2003 | Renaud et al. |
| 2004/0037743 | A1 | | 2/2004 | Hirota et al. |
| 2004/0206391 | A1 | * | 10/2004 | Guzman et al. ............ 137/15.01 |
| 2005/0047969 | A1 | * | 3/2005 | Zhao et al. .................... 422/100 |
| 2005/0247673 | A1 | | 11/2005 | Delamarche et al. |
| 2006/0153741 | A1 | * | 7/2006 | Yoshida ........................ 422/100 |
| 2007/0160502 | A1 | | 7/2007 | Hwang et al. |
| 2008/0011374 | A1 | * | 1/2008 | Hidaka et al. ................. 137/884 |
| 2008/0115849 | A1 | * | 5/2008 | Yang et al. .................... 137/833 |
| 2008/0266367 | A1 | * | 10/2008 | Ravkin et al. .................. 347/85 |
| 2008/0277006 | A1 | * | 11/2008 | Moon et al. ................... 137/833 |
| 2009/0260692 | A1 | * | 10/2009 | Walavalkar et al. ............ 137/13 |
| 2011/0081280 | A1 | * | 4/2011 | Hwang et al. ................. 422/503 |
| 2011/0300034 | A1 | * | 12/2011 | Mair et al. .................... 422/502 |
| 2012/0241034 | A1 | * | 9/2012 | Wilke et al. ................... 137/597 |

FOREIGN PATENT DOCUMENTS

| | | |
|---|---|---|
| JP | 2005111567 A | 4/2005 |
| WO | 03054518 A1 | 7/2003 |
| WO | 2006014460 A3 | 2/2006 |

OTHER PUBLICATIONS

David Juncker et al "Multipurpose Microfluidic Probe," Nature Materials; Articles; vol. 4. No. 8, pp. 622-628; Aug. 2005.

Paul J.A. Kenis et al, "Microfabrication Inside Capillaries Using Multiphase Laminar Flow Patterning," Science-American Association for the Advancement of Science—AAAS; vol. 285; pp. 83-85; Jul. 1999.

A. Meister et al., "Nanodispenser for Attoliter Volumn Deposition Using Atomic Force Microscopy Probes Modified by Focused-Ion-Beam Milling," American Institute of Physics; Applied Physics Letters; vol. 85, No. 25, pp. 6260-6262; Dec. 2004.

Kit T. Rodolfa et al., "Nanoscale Pipetting for Controlled Chemistry in Small Arrayed Water Droplets Using a Double-Barrel Pipet," NANO Letters; vol. 6, No. 2, pp. 252-257, 2006.

Liming Ying et al., "Programmable Delivery of DNA Through a Nanopipet," Analytical Chemistry, vol. 74; No. 6, pp. 1380-1385; 2002.

Andreas Bruckbauer et al., "Multicomponent Submicron Features of Biomolecules Created by Voltage Controlled Deposition from a Nanopipet," JACS Articles; J. AM. Chem. Soc.; vol. 125, No. 32; pp. 9834-9839; 2003.

Todd M. Squires & Stephen R. Quake, "Microfluidics: Fluid Physics at the Nanoliter Scale," The American Physical Society: Reviews of Modern Physics; vol. 77; pp. 977-1026; Jul. 2005.

Andre Meister et al., "Nanoscale Dispensing in Liquid Environment of Streptavidin on a Biotin-Functionalized Surface Using Hollow Atomic Force Microscopy Probes," Microelectronic Engineering; Proceedings of the Micro- and Nano-Engineering 2008 Conference—MNE 2008 in press; vol. 86, Issues 4-6, Apr.-Jun. 2009, pp. 1481-1484.

James B. Knight et al., "Hydrodynamic Focusing on a Silicon Chip: Mixing Nanoliters in Microseconds," The American Physical Society; Physical Review Letters; vol. 80, No. 17, pp. 3863-3866; Apr. 1998.

Andreas Bruckbauer et al., "Writing with DNA and Protein Using a Nanopipet for Controlled Delivery," JACS Communications; Journal of American Chemical Society; vol. 124, No. 30; pp. 8810-8811; 2002.

James P. Brody et al., "Biotechnology at Low Reynolds Numbers," Biophysical Journal; vol. 71, pp. 3430-3441; Dec. 1996.

Brian Derby, "Bioprinting: Inkjet Printing Proteins and Hybrid Cell-Containing Materials and Structures," Journal of Materials Chemistry; Highlight; vol. 18; pp. 5717-5721; 2008.

Keun-Ho Kim et al., "A Nanofountain Probe with Sub-100 nm Molecular Writing Resolution," Patterning Techniques; Small; vol. 1, No. 6, pp. 632-635; 2005.

International Search Report; International Application No. PCT/IB2010/052018; International Filing Date: May 7, 2010; Date of Mailing: Jun. 1, 2011; pp. 1-5.

International Search Report—Written Opinion; International Application No. PCT/IB2010/052018; International Filing Date: May 7, 2010; Date of Mailing: Jun. 1, 2011; pp. 1-7.

Hossein Ahmadzadeh et al.,"On-Column Labeling for Capillary Electrophoretic Analysis of Individual Mitochondria Directly Sampled From Tissue Cross Sections," Anal. Bioanal. Chem. vol. 384, pp. 169-174, 2006.

Arthur Queval et al., "Design and Fabrication of a PDMS Microfluidic Probe and Perfusion Chamber for Microfluidic Experiments With Organotypic Brain Slices," Twelfth International Conference on Miniaturized Systems for Chemistry and Life Sciences; San Diego; pp. 1663-1665; Oct. 2008.

Hitoshi Shiku et al., "A Microfluidic Dual Capillary Probe to Collect Messenger RNA From Adherent Cells and Spheroids," Analytical Biochemistry; vol. 385; pp. 138-142; 2009.

Andreas Bruckbauer et al., "Multi-Component Sub-Micron Features of Biomolecules Created by Voltage Controlled Deposition From a Nanopipet," Supplementary Materials; pp. S1-S5; 2003.

David Juncker et al., "Multipurpose Microfluidic Probe," Supplementary Material; One page; Nature Publishing Group; 2005.

Andreas Bruckbauer et al., "Writing with DNA and Protein Using a Nanopipet for Controlled Delivery," Supporting Information; pp. S1-S4; 2002.

International Preliminary Examination Report; International Application No. PCT/IB2010/052018; International Filing Date: May 7, 2010; Date of Mailing: Sep. 27, 2011; pp. 1-18.

* cited by examiner

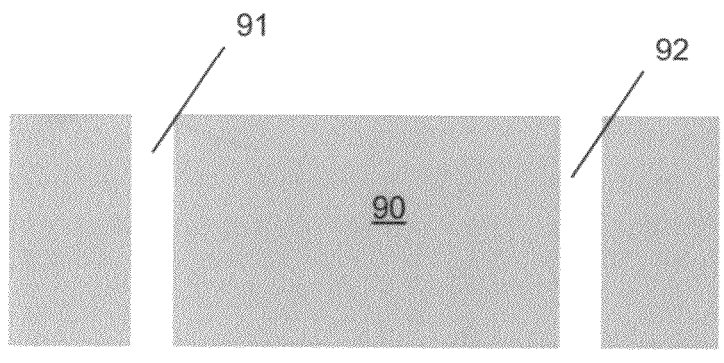
FIG. 1.A
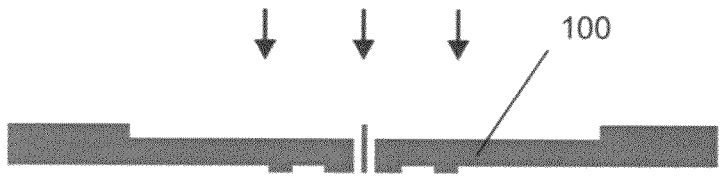
FIG. 1.B
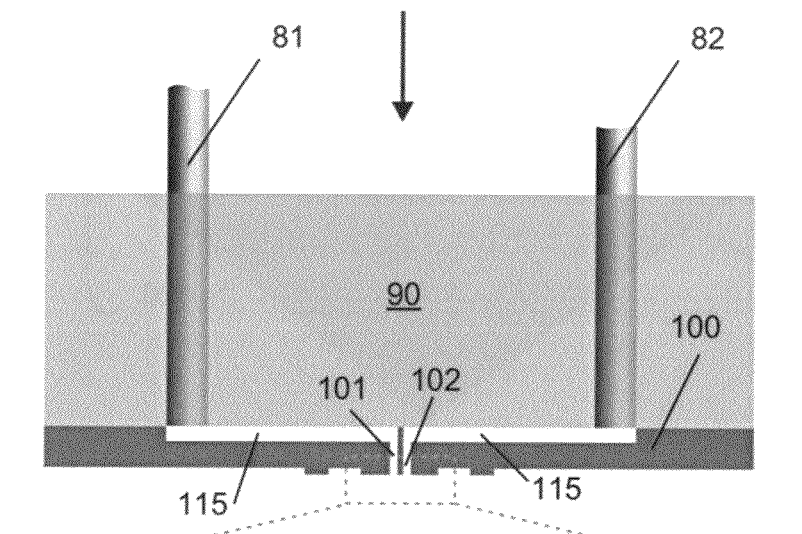
FIG. 1.C
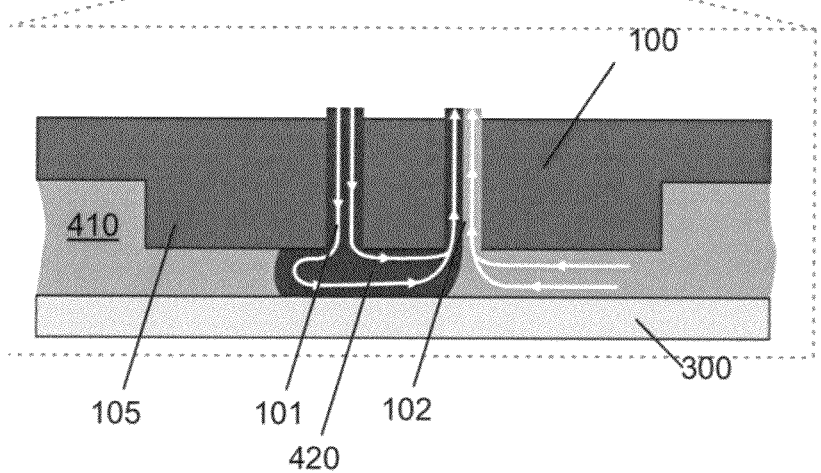
FIG. 1.D

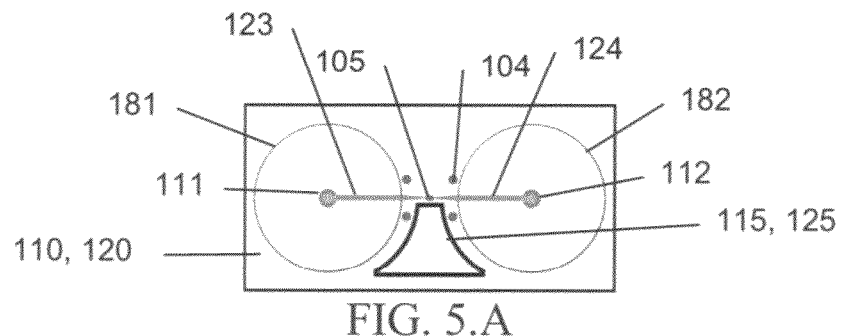
FIG. 5.A
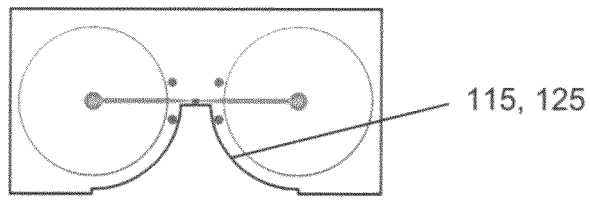
FIG. 5.B
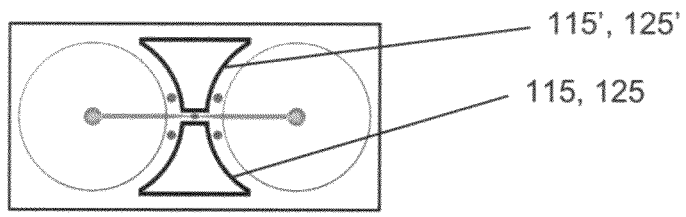
FIG. 5.C
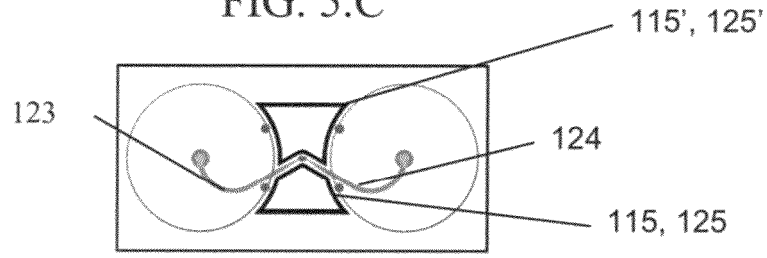
FIG. 5.D
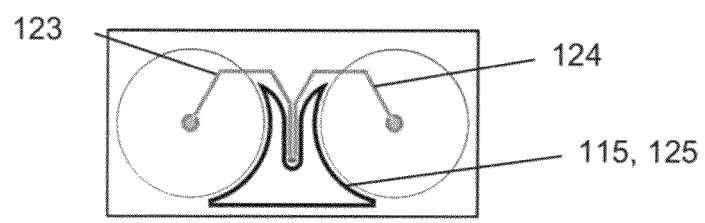
FIG. 5.E

MULTILAYER MICROFLUIDIC PROBE HEAD AND METHOD OF FABRICATION THEREOF

PRIORITY

This is a U.S. national stage of application No. PCT/IB2010/052018, filed on 7 May 2010. Priority under 35 U.S.C. §119(a) and 35 U.S.C. §365(b) is claimed from European Patent Application No. 09159608.0, filed 7 May 2009, and all the benefits accruing therefrom under 35 U.S.C. §119, the contents of which in its entirety are herein incorporated by reference.

BACKGROUND

The disclosure relates in general to the field of microfluidic probe devices, and in particular, to a microfluidic probe head and a method of fabrication thereof.

Microfluidics generally refers to microfabricated devices, which are used for pumping, sampling, mixing, analyzing and dosing liquids. Prominent features thereof originate from the peculiar behavior that liquids exhibit at the micrometer length scale. Flow of liquids in microfluidics is typically laminar. Volumes well below one nanoliter can be reached by fabricating structures with lateral dimensions in the micrometer range. Reactions that are limited at large scales (by diffusion of reactants) can be accelerated. Finally, parallel streams of liquids can possibly be accurately and reproducibility controlled, allowing for chemical reactions and gradients to be made at liquid/liquid and liquid/solid interfaces. Microfluidics are accordingly used for various applications in life sciences.

Most microfluidic devices have user chip interfaces and closed flow paths. Closed flow paths facilitate the integration of functional elements (e.g., heaters, mixers, pumps, UV detector, valves, etc.) into one device while minimizing problems related to leaks and evaporation. However, processing or patterning surfaces with such microfluidics is hard to achieve.

Inkjets were designed which can for instance deliver ink in a non-contact mode but not in the presence of an immersion liquid. Other techniques can further pattern surfaces at even higher resolution but are limited in their ability to operate in a liquid environment. Liquid environments minimize drying artifacts, denaturation of biomolecules, and enable working with living microorganisms.

For patterning surfaces and analyzing samples on a surface in the presence of a liquid environment, several strategies were developed to overcome limitations of closed microfluidics. Some strategies rely on confining liquids near a surface or, still, delivering a precise amount of biomolecules in a well defined region of a liquid. Scanning nanopipettes and hollow Atomic Force Microscopy (AFM) probes were also developed for patterning biomolecules on surfaces with micrometer accuracy.

As an other example, a non-contact microfluidic probe technology (or "MFP") was developed (see, e.g., US 2005/0247673), which allows to pattern surfaces by adding or removing biomolecules, create surface density gradients of proteins deposited on surfaces, localize reactions at liquid interphases in proximity to a surface, stain and remove adherent cells on a surface. Other applications have been tested.

FIGS. 1A-D depict such a MFP head 100 and further illustrate its working principle. The part 105 (FIG. 1D) of the head 100 that confines the liquid is a Si chip that has two apertures 101, 102. It is brought close to a substrate 300 of interest. Horizontal microchannels 115 (FIG. 1C) on the other face of the chip 100 link the apertures with vias 91, 92 formed in a poly(dimethylsiloxane) (PDMS) connection block 90, FIG. 1A. Capillaries 81, 82 inserted in the PDMS provide connection between motorized pumps and apertures 101, 102. Therefore, by controlling the flow rate of a liquid 420 injected through one aperture 101 and by reaspirating it from the other aperture 102 (together with some of the immersion liquid 410), confinement of the injected liquid 420 is achieved, FIG. 1D. Such an MFP head as assembled is schematically depicted in FIG. 1C.

Although this MFP technology is advantageous in many respects and for a range of applications, challenges remain to be solved in terms of fabrication. In particular, assembling the Si head 100 with the PDMS connection block 90 and inserting the glass capillaries 81, 82 is labor intensive. Such operations also have limited yield because the Si chip and PDMS are small and difficult to handle. In addition, stress in the PDMS block 90 during bonding to the Si head and insertion of the capillaries can lead to the detachment of the PDMS. Moreover, micro fabricating small apertures in a thick Si wafer using e.g., deep reactive ion etching (DRIE) or plasma etching, is likely challenging and time consuming, owing to the thickness that the head must have for e.g., mechanical stability. Such limitations may hinder the industrialized deployment of MFP technology.

For the sake of completeness, US 2007/0160502, JP 2005/111567 and U.S. Pat. No. 5,882,465 also deal with processes of fabrication of microfluidic devices or reactors.

BRIEF SUMMARY

In one embodiment, a multilayer micro fluidic probe head includes a first layer, a second layer, and a first tubing port extending from an upper face of the first layer, wherein the first layer has a first via enabling fluid communication between the first port and a lower face of the first layer; the second layer includes a first aperture on a face thereof; and a first microchannel enabling fluid communication between an upper face of the second layer, facing the lower face of the first layer, and the first aperture; and the head is further configured to enable fluid communication between the first via and the first microchannel, wherein at least a portion of the first microchannel is a groove open on the upper face of the second layer, and closed by a portion of a lower face of a layer of the head, and wherein the micro fluidic probe head further comprises a second tubing port, a second via, a second aperture and a second microchannel, configured similarly as the first tubing port, the first via, the first aperture and the first microchannel; the head being further configured to enable distinct fluid communications between the first via and the first aperture on the one hand, and between the second via and the second aperture on the other hand; and to allow for aspirating at one of the apertures some fluid deposited via the other aperture on a surface close to the apertures.

A system and method embodying the present disclosure will now be described, by way of non-limiting example, and in reference to the accompanying drawings.

BRIEF DESCRIPTION OF THE SEVERAL VIEWS OF THE DRAWINGS

FIGS. 1A-D show an MFP of the prior art and its working principle;

FIGS. 5A-E show sectional views of MFP head layers provided with optical windows, according to variants of FIG. 2;

DETAILED DESCRIPTION

Disclosed herein is a multilayer micro fluidic probe (or MFP) head. The head may include first and second layers facing each other, and a tubing port. The tubing port extends from the first layer. The latter comprises a via, which may face the port, wherein fluid communication is enabled through the first layer towards the second layer. The second layer includes at least one microchannel, relaying fluid communication to an aperture on a face of the second layer.

Such a multilayered MFP head is easier to fabricate and to package than heads made with unitary construction, such as evoked in the background section. In particular, a microchannel can advantageously be engraved as a groove at the level of the interface between the two layers. The MFP head can further be interfaced with tubing using, e.g., a standard fitting for tubing port. The disclosure has substantial potential for, e.g., patterning continuous and discontinuous patterns of biomolecules on surfaces as well as for direct processing of resist materials in a non-contact mode.

Figure 2:
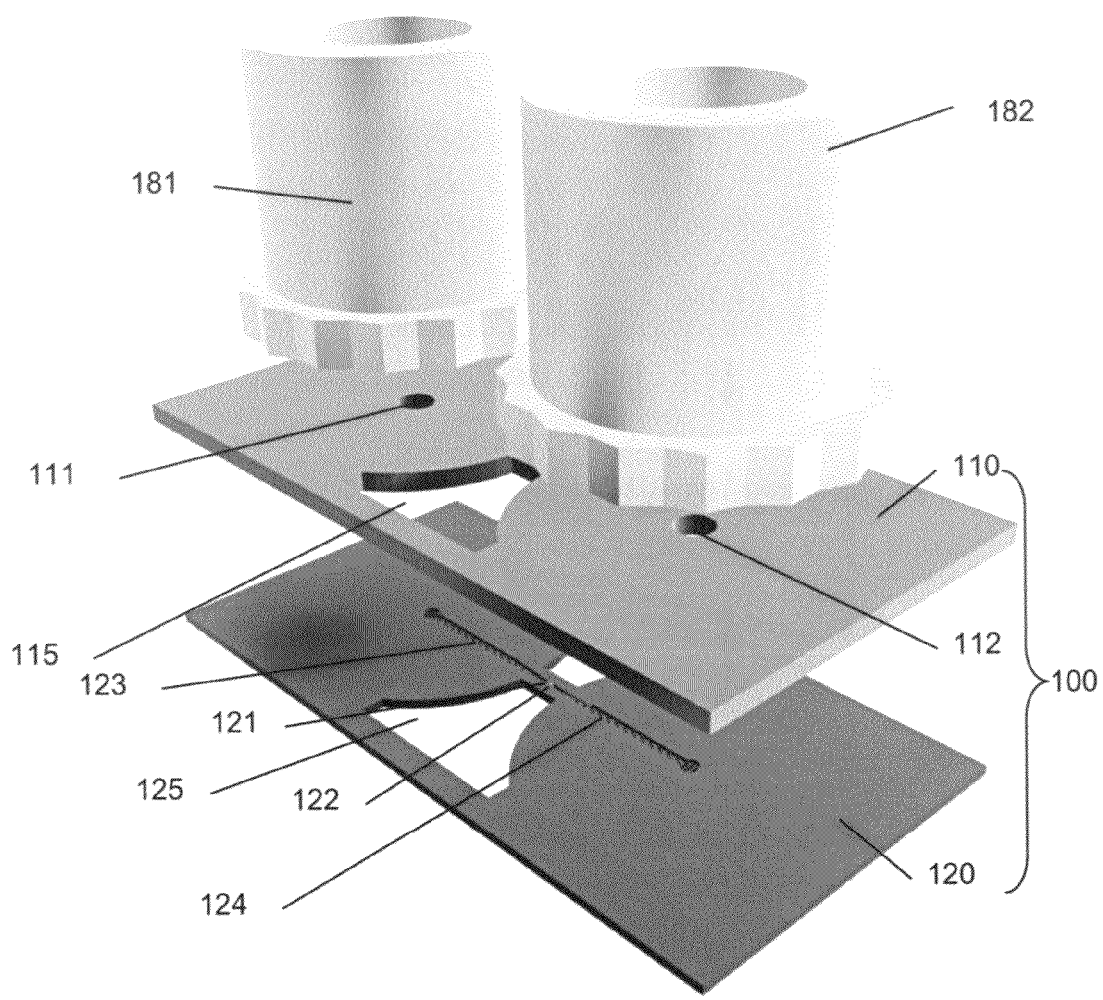
FIG. 2 is an exploded view of an MFP head according to an embodiment of the present disclosure.

FIG. 2 shows an exploded view of a multilayer MFP head 100 according to an embodiment of the disclosure. The multilayer head comprises at least one first layer 110 and second layer 120. It further has tubing ports 181 and 182, extending from the upper face of the layer 110 (after assembling the ports and the first layer). The layer 110 further comprises vias 111 and 112. As illustrated in the drawing, vias and ports are configured to enable fluid communication from the ports to the lower face of the first layer 110, i.e., towards the second layer.

The second layer 120 further comprises apertures 121, 122, open on a face thereof, e.g., the lower face, not visible in FIG. 2. They preferably extend through the second layer, e.g., as a through hole, which in practice is easily machined. Apertures 121, 122 shall be discussed in more details in reference to subsequent drawings.

The second layer 120 further comprises microchannels 123, 124, which together with respectively joined apertures 121, 122 enable fluid communication from the upper face of the second layer (i.e., facing the lower face of the first layer 110), up to the apertures 121, 122. In the example of FIG. 2, fluid communication is accordingly enabled toward the lower face of the second layer 120. Several embodiments of the present disclosure involve pairs of ports, vias, microchannels and corresponding apertures, as exemplified below. The role of the microchannels is to enable fluid communication from the vias (likely large) up to the apertures, which are comparatively small and likely close to each other, for applications that shall be discussed below.

Note that, as illustrated, the MFP head is further configured to enable fluid communication between vias 111, 112 and microchannels 123, 124. To this aim, ends of the microchannels are likely to face the vias, as depicted. The ends might, for instance, have slightly larger dimensions in comparison to an average section of the microchannels.

As apparent from FIG. 2, such a MFP head is easily fabricated. First, using an additional layer for the head allows for tubing ports to be easily mounted thereon, which are more easily handled than e.g. capillaries in a PDMS block. Second, only the lower layer 120 needs substantial machining for creating apertures and microchannels. Now, all other things being equal, the lower layer 120 is likely thinner than a whole MFP head. Accordingly, creating apertures, e.g. as through holes, is more easily achieved (e.g., by deep reactive ion etching), in spite of their likely small dimensions.

In addition, at least a portion of a microchannel 123, 124 is preferably provided as a groove in the layer thickness of the second layer 120, open on the upper face thereof. This way, forming a microchannel is easily achieved, in spite of its dimensions. After assembly, the groove is closed by a portion of the first layer 110. The groove may be engraved by a tool directly on the upper surface of the second layer 120. It can have any appropriate section shape, e.g. rounded, square, U or V section. The required tool is typically chosen according to the material of the second layer 120. In a variant, laser ablation can be contemplated. Most advantageously yet, deep reactive ion etching is used for fabrication of microchannels too, as to be discussed later.

As depicted in FIG. 2, the grooves 123, 124 extend up to respective apertures 121, 122. In a variant that shall be discussed in reference to FIGS. 7-11, an aperture is directly formed by an end of the groove at the level of an edge of the upper face of the second layer, which is here again easily machined.

Figure 3:
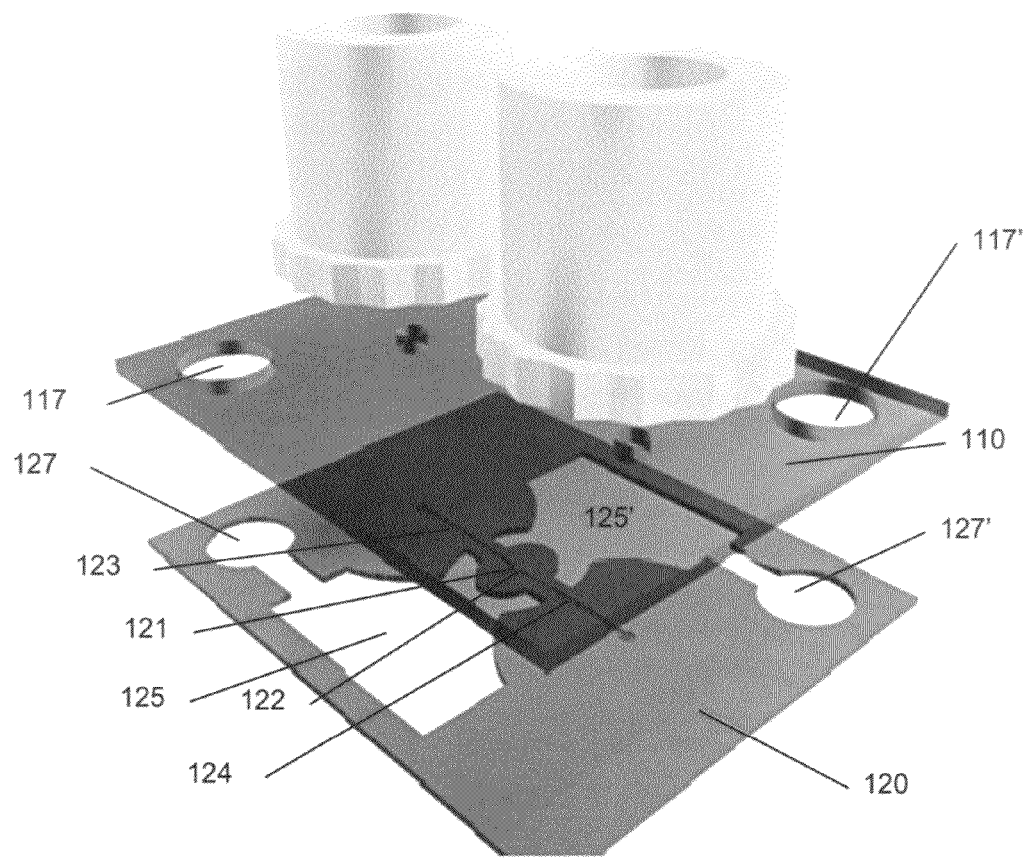
FIGS. 3-4 show exploded views of an MFP head according to variants of the embodiment of FIG. 2.

Next, as further depicted in FIGS. 2-5E, the MFP head may further comprise one or more optical window(s) 115, 125 in the first 110 and/or the second layer 120, for improving visualization of samples studied. Briefly, in an embodiment, windows are provided in both layers 110, 120 of the MFP (FIG. 2). In an alternative embodiment, windows are provided in the lower layer 120 only but then the upper layer 110 is transparent (FIG. 3). In still other alternative embodiments, the MFP head may include one or more additional layers (such as layer 130 as in FIG. 4). As illustrated, opaque layers 110, 120 have optical windows 115, 125 provided therein, facing each other, while the intermediate layer 130 is transparent.

The optical windows may for instance be formed using the same technique and fabrication step when forming the apertures 121 and 122 in the second layer or when forming the vias 111 and 112 in the first layer.

Moreover, as depicted in FIG. 3, first and second inlet windows 117, 127 may further be provided in each of the first 110 and second layer 120, respectively. Owing to the arrangement of layers 110, 120, fluid communication can be enabled from the first inlet window 117 to the second inlet window 127. In addition, the second inlet window 127 is in fluid communication with the optical window 125. To that aim, a channel can simply be provided in the second layer 120 that connects the window 125 to inlet window 127. Possibly, another set of window 125', inlet windows 117', 127' can be provided, e.g., symmetrically with respect to the microchannels, be it for improving visualization.

Inlet windows 117, 127 allow for dispensing liquid to the window 125, and thus to an interface between the second layer 120 and a sample surface. In that respect and as illustrated, inlet windows 117, 127 are advantageously provided off-centered.

Figure 4:
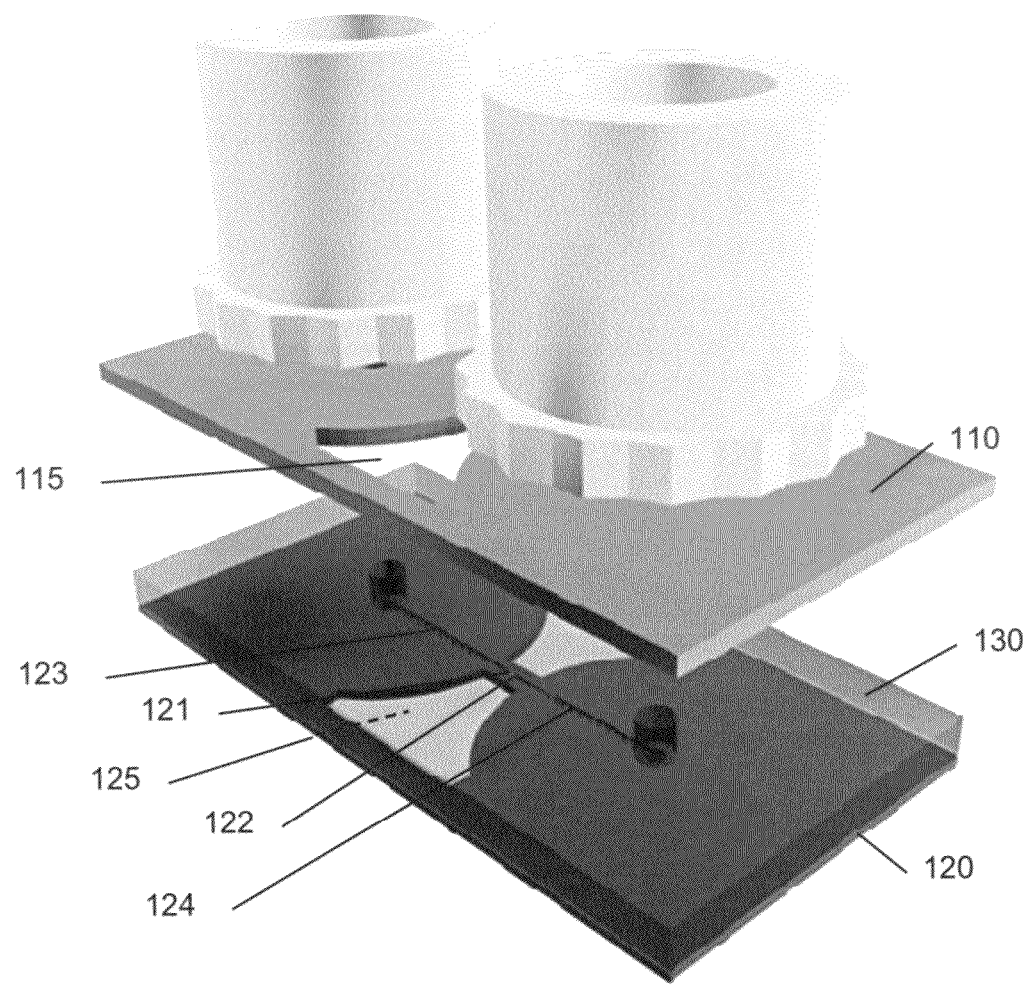

In FIG. 4, a third layer 130 (transparent) is provided at intermediate position between the first 110 and second layer 120. Yet, the MFP head remains configured such as to enable fluid communication, through the third layer 130, between the vias of the first layer 110 and the microchannels of the second layer 120. As evoked above, it may have an optical window 125, the upper layer 110 being transparent (e.g., SU8 or glass), as in FIG. 3, or having a window 115 too (as in FIG. 2). However, creating an optical window in the lower layer 120 (typically in silicon) reduces its mechanical stability. This may complicate the phase of bonding layers 110 and 120. In this respect, the intermediate layer 130 (preferably a soft layer, e.g., poly(dimethylsiloxane) that is treated with an oxygen-based plasma) is used to ease the bonding of the upper and lower layers 110, 120. Meanwhile, the thinner the layers 110, 120, the simpler they are to machine with precision, hence the utility of a multilayered head.

Optical windows 125, 125' allow for opaque samples to be much easily handled. In fact, MFP heads are usually microfabricated in a silicon wafer. As described earlier, they preferably have apertures for both injecting and aspirating a liquid over a surface. The gap between the head and the sample is in this case typically filled with an "immersion" liquid. Monitoring the distance between the MFP head and the sample is useful for preventing damages of the head, selecting an area of the sample to be probed, or monitoring processes occurring on the sample. Accordingly, merely transparent samples could easily be studied so far, using an inverted microscope for monitoring the head-sample interactions.

Owing to the optical windows provided in the MFP head layers, opaque samples can be now more easily handled. This opens the door to novel applications of the MFP technology such as tissue section analysis. In addition, samples to be processed or analyzed can be monitored from above; standard upright microscopes and binoculars may for instance be used.

Referring shortly back to FIG. 3, the optical windows 125, 125' are furthermore advantageously conformed for dispensing and holding the immersion liquid. For example, an immersion liquid can be pipetted directly into the inlet window 127, connected to the optical window 125, hence the reason for designing it off-centered. In a variant, it can be dispensed using a capillary connected to a pump.

Next, the design of the optical windows may take into account requirements on fabrication processes and mechanical stability of the MFP head layers. Various shapes can be contemplated, as illustrated in the sectional views of FIGS. 5A-E. The figures schematically depict assembled layers 110, 120 of an MFP (e.g. the layers 110 and 120 evoked in reference to FIG. 2). In FIGS. 5A-E, the inner bold line represents the periphery of optical windows 115, 125 (115', 125'), e.g., it delimitates an area of material removed during fabrication. The outer line represents the periphery of MFP head layers, e.g., viewed from above. Projections of the following elements are furthermore depicted: the periphery of areas corresponding to the lower face of the ports 181, 182 to be bonded on the upper layer; the areas corresponding to vias 111, 112 through upper layer 110 of the MFP head; and microchannels 123, 124 on the upper face of lower layer 120 (for connecting vias to apertures).

Additional elements appear, reflecting exemplary embodiments in which a central mesa 105 is provided, wherein apertures are likely provided (not visible at this scale), as well as posts 104 (for preventing crash head on the surface and to help in-plane alignment). Fabrication of such a mesa and posts is known in the art.

For example, a pair of windows 115, 125 could be designed as illustrated in FIG. 5A, which just reflect the shapes already visible in FIG. 2.

In FIG. 5B, the windows 115, 125 are open on an edge of the layers, which may be easier to machine, according to the material chosen for the layer 110, 120 and machining tool available.

In FIGS. 5C-D, additional windows 115', 125' are provided, for example symmetric to the windows 115, 125 with respect to the main longitudinal axis of the MFP head (as in FIG. 5C). This increases visualization possibilities. The shape of the microchannels 123, 124 may be adapted accordingly. Yet, microchannels 123, 124 are preferably still engraved as grooves on a layer.

A very asymmetric pattern could be designed, as in FIG. 5E, in order to optimize visibility from a given point in space. Again, the shape of the microchannels 123, 124 is adapted accordingly.

Figure 6:
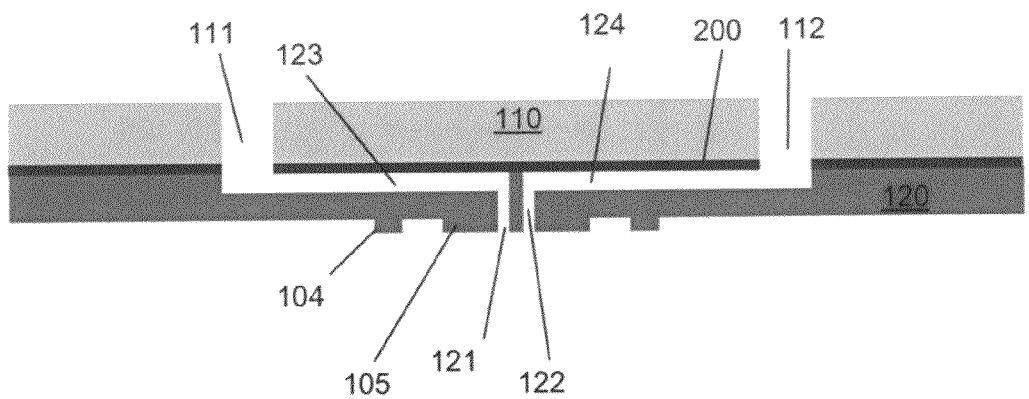
FIG. 6 schematically depicts a sectional view of the MFP head of FIG. 2, through a surface perpendicular to the mean plane of the layer, along the microchannels.

Next, FIG. 6 shows a schematic view of a section in the longitudinal symmetry plane of two layers 110, 120 of an assembled MFP head, according to an embodiment of the disclosure. The section plane is the one including the mean axis of the microchannels and perpendicular to the mean plane of the layer 110, 120. As in FIGS. 2-4, the first (upper) layer 110 and second (lower) layer 120 are represented, as well as the microchannels 123, 124 and the vias 111, 112. As further evoked above, one or more post 104 and a mesa 105 are provided on the lower side of the second layer 120. A spincoat adhesive layer 200 is furthermore visible, as a result of bonding the first layer 110 to second layer 120.

In the embodiment of FIG. 6, apertures are formed as through holes in the second layer 120, adjoining at one end respective microchannels 123, 124. The microchannels 123, 124, spread horizontally, engraved on the upper face of the layer 120, from a location corresponding to vias 111, 112 and up to the upper ends of the apertures. A simple configuration is thereby achieved which enables fluid communication from the vias (upper side) to the apertures (lower side), through the microchannels. As shall be further discussed below, the microchannels 123, 124, the vias 111, 112, and the apertures 121, 122 are advantageously obtained using a same technique, namely deep reactive ion etching (DRIE).

Also, in FIG. 6, apertures 121, 122 are configured to allow for aspirating at one of the apertures 122 some fluid deposited via the other aperture 121 on a sample surface, in the vicinity of the apertures. Their shape, dimensions and relative position, which are defined on a design level, govern the hydrodynamic flow confinement (HFC) of a liquid over a surface to a large extent. Other parameters contributing to the HFC are the injection and aspiration flow rates, trajectory and speed of the head over the substrate, and the separation distance between the head and substrate, which can all be modified interactively.

As stated, the fabrication of MFP heads as described above is substantially simplified. Basically, the fabrication scheme comprises two major stages. During a first stage, one fabricates: one or more via in the first layer, e.g., by DRIE; and one or more microchannel in the second layer, e.g., by DRIE.

As further evoked, apertures can be formed in the second layer, using e.g., DRIE as well. For example, the apertures, which have typical lateral dimensions of a few tens of micrometers, are etched completely through the second layer.

Then, a second stage includes assembling the first and second layers. The ports are preferably mounted afterwards, for ease of manipulation. Details of an exemplary method of fabrication of the main features of the MFP head are now discussed.

A multilayered MFP head such as described in FIGS. 2 and 6 is microfabricated using Si wafers, although other materials can be used. Let call the upper layer 110 the Si lid and the lower layer 120 the HFC chip, for the sake of distinction. A single-side and a double-side polished Si wafers are used for the Si and HFC chip, respectively. Both wafers are e.g., 4 inch in diameter and 400 µm in thickness (Siltronix, Geneva, Switzerland).

The microstructures are made using standard photolithography, photoplotted polymer masks (Zitzmann GmbH, Eching, Germany) and DRIE, see e.g., STS ICP, Surface Technology Systems, Newport, UK. The microchannels of the HFC chips can be etched 50 µm deep into the upper face of the HFC wafer. The bottom side of the wafer can be processed to form the mesa and posts to a height of 50 µm. Opening the apertures is performed using DRIE etching from the bottom side of the HFC wafer. Well defined apertures with lateral dimensions of less than 10 µm can thereby be obtained. The apertures can be more accurately fabricated when a thin Si wafer is used for the HFC chip while the lid wafer can remain thick to provide mechanical strength to the head.

The Si lid is produced by etching vias with a diameter of 800 µm trough a one side polished wafer. Next, assembly of both wafers is achieved by spin coating ~3 µm of a polyimide adhesive (HD Microsystems GmbH, Neu-Isenburg, Germany) onto the polished side of the lid wafer and by subsequently aligning and bonding both wafers. Bonding takes place at 320° C. with 2 bar pressure for 10 minutes (PRESSYS LE, Paul-Otto Weber GmbH, Remshalden, Germany). The MFP heads can then be diced and stored.

Mounting the ports can be carried out using epoxy adhesive rings (Nanoport™ Assemblies from Upchurch Scientific, Ercatech, Bern, Switzerland, epoxy adhesive rings are supplied). The use of standard ports and fittings in place of, e.g., molded block of PDMS diminishes labor needed for assembling a head. MFP heads are preferably tested for leakage and clogging before actually mounting the ports, as incursion of adhesive into the microchannels cannot be excluded. In that respect, a disposable pipette tip can be cut to match the size of the vias and liquid can be pushed through the channels while observing with a magnifying glass if droplets are able to exit the apertures without leaking elsewhere. Alignment of the ports with the vias can finally be done manually. A subsequent bonding take place, e.g., at 140° C. for ~1 hour on a hotplate or in an oven.

Reverting briefly to the photolithographic steps, the fabrication of a multilayered MFP head likely uses three photolithographic steps (coating, exposing and developing a resist followed by etching Si) as to the HFC chip and one step for the Si lid. In comparison, monolithic MFP heads as known in the prior art required three steps. The previous heads, however, also required molding a PDMS connection block that needed to be plasma treated and bonded to the Si chip, leading to drawbacks discussed earlier.

In contrast to using a PDMS connection block, the new fabrication method described here yields a Si lid having large vias (e.g., in the range of 1 mm in diameter), which connect structures between the ports and the HFC chip. On the other hand, the HFC chip comprises all microstructures. In particular, microchannels on the upper side of the HFC chip provide fluidic connection between the vias and apertures which are located in the center of the HFC chip. Posts around the mesa are used as leveling aids when adjusting the MFP head for experiments, as evoked in reference to FIGS. 5A-E.

MFP heads such as discussed above are particularly useful notably for surface processing applications. The latter, unlike biological applications, deal with potentially smaller patterns and a broader range of liquids and chemicals. Employing a thin Si wafer (e.g. 100 µm in thickness) to fabricate the HFC chip, one may fabricate well defined apertures with lateral dimensions of less than 10 µm, using conventional DRIE or focused ion beam. The mechanical strength of the head is merely provided by the Si lid.

Incidentally, multilayered heads such as discussed herein are also more amenable to using many processing liquids because apertures can be small and close to each other with horizontal microchannels sufficiently fanning out for leaving sufficient space for adding many ports on the Si lid.

More generally, the present MFP technology has a potential for patterning surfaces, processing materials, depositing and removing biomolecules and cells on surfaces, analyzing cells and biomolecules on surfaces, creating chemical gradients on surfaces, studying complex biological specimens such as tissue sections, and creating structures with unusual profiles such as tapered cavities.

Next, another type of embodiments of the multilayer head of the disclosure shall be discussed in reference to FIGS. 7-11.

Figure 7:
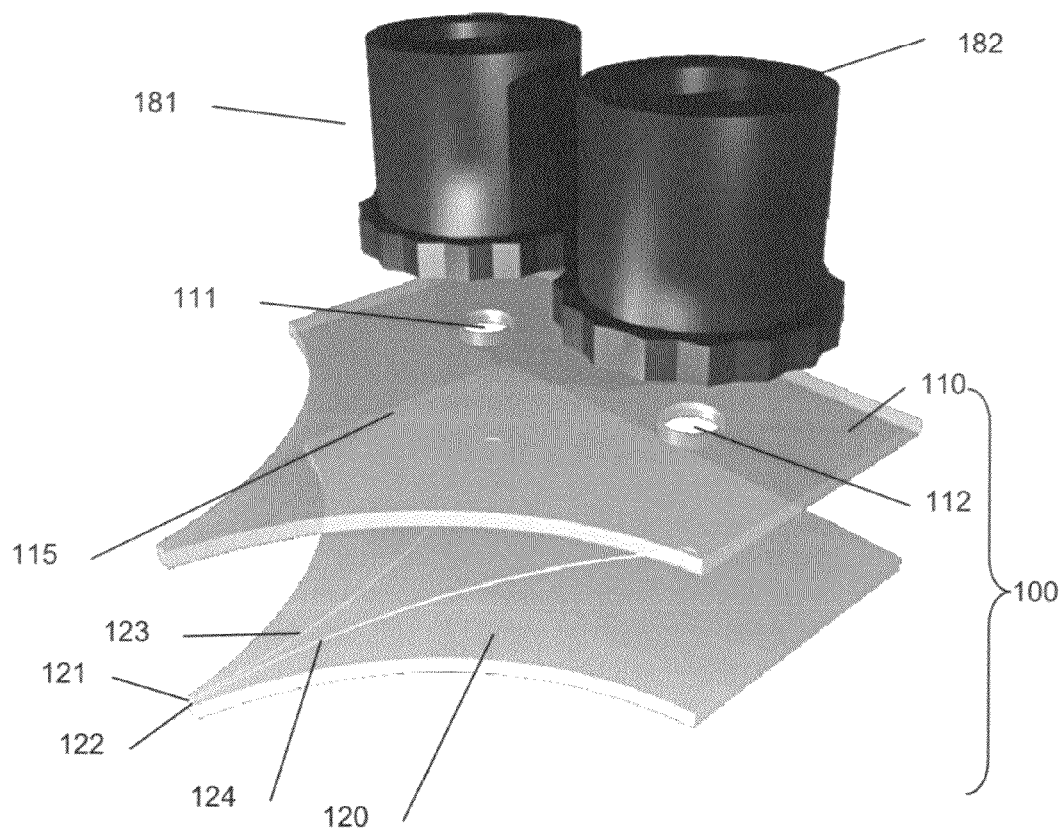
FIG. 7 is an exploded view of an MFP head according to another embodiment of the present disclosure.

As depicted in FIG. 7, the MFP head is similar to that of FIG. 2 (layers 110, 120, vias 111, 112, and tubing ports 181 and 182 are provided, similar to their counterparts in FIG. 2). However, microchannels 123, 124 extend here up to an edge 310 of the upper face of the second layer 120, see FIG. 8. Apertures 121, 122 are actually formed by an end of the grooves 123, 124, at the level of the edge 310. Basically, such an embodiment obviates the need for an explicit fabrication of apertures. For example, microchannels are engraved as grooves spreading horizontally up to the edge of the upper face of the second layer 120, whereby apertures for the microchannels result, without additional machining required.

Figure 8:
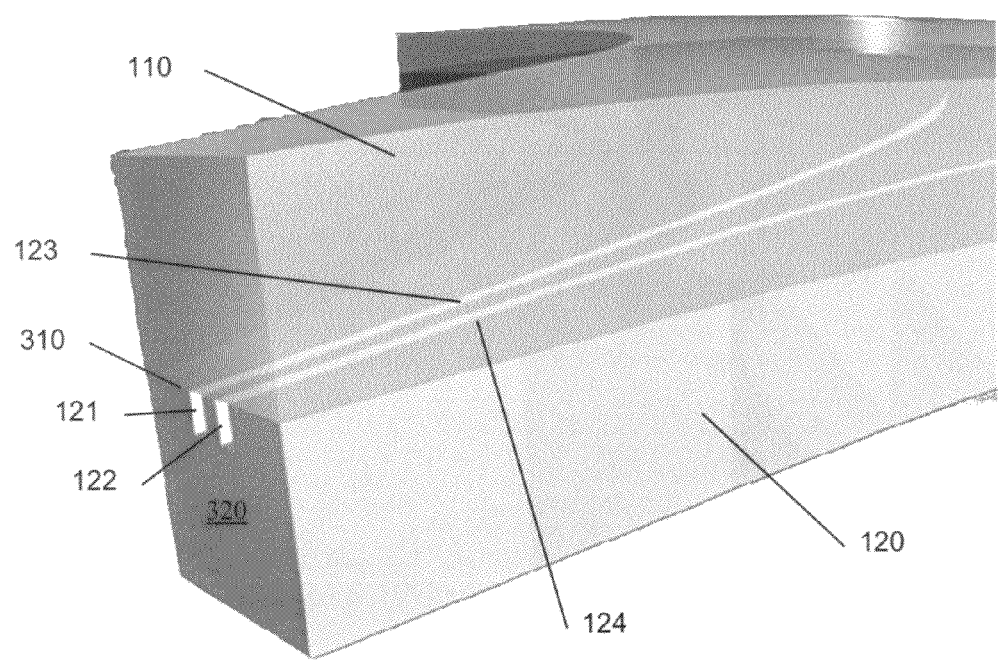
FIG. 8 focuses on an edge surface of the MFP head of FIG. 7.

In the particular embodiment of FIG. 7 or 8, apertures 121, 122 are open on the face 320 perpendicular to the upper face of the lower layer 120. This results from an advantageous variant of the fabrication method that shall be described later. This variant still allows for smooth operation of the MFP head on sample surfaces.

Several variants to the embodiment of FIGS. 7-8 can be contemplated which are advantageous in many respects.

For example, fabricating the microchannels can be carried out such that a characteristic of the microchannel (i.e., the mean section) changes continuously. Hence, one may adjust the characteristic at stake by simply cutting the two layers 110, 120 preferably after assembly of the layer, at the level of the edge surface 320.

Figure 9:
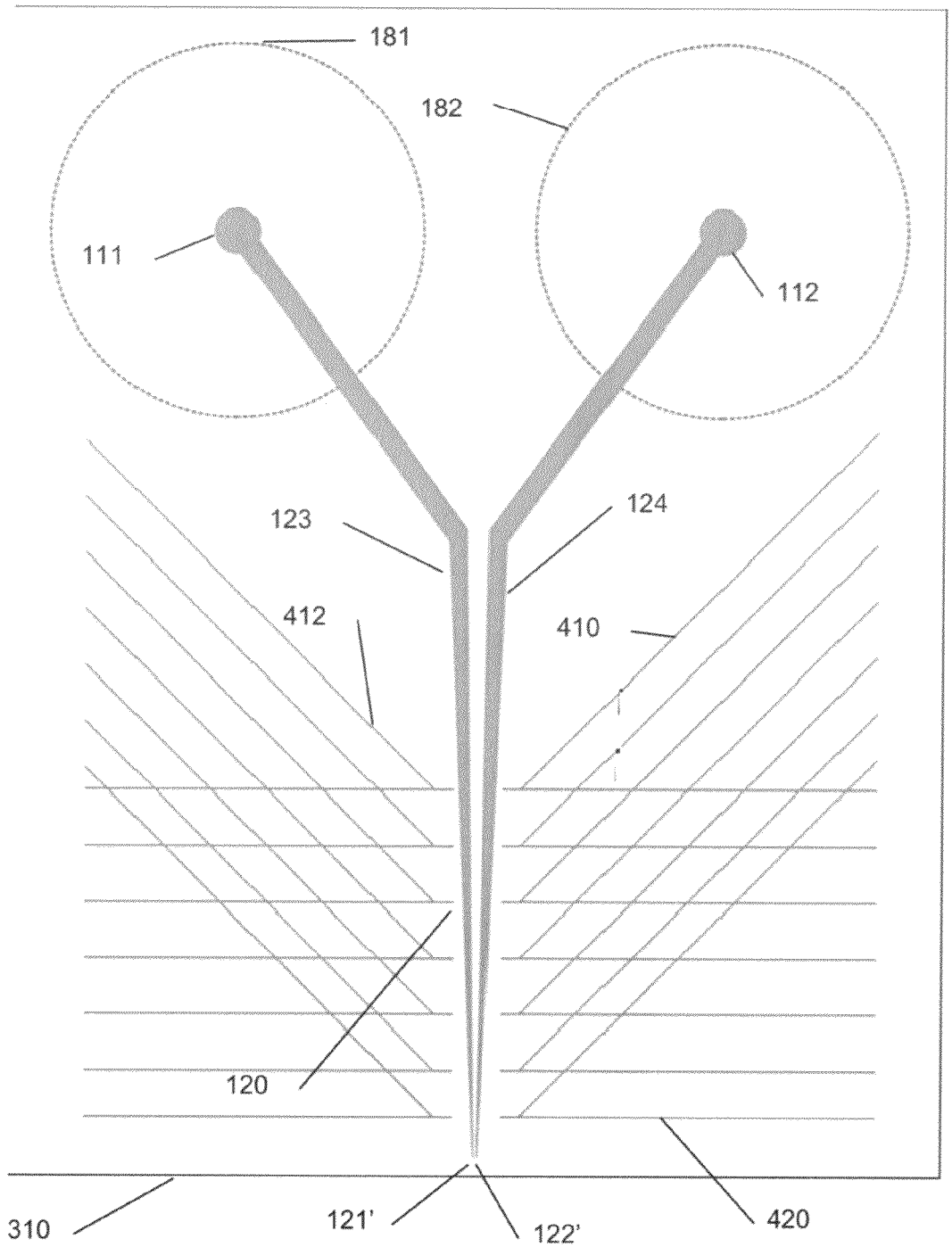
FIG. 9 is a schematic top view of a layer of the MFP head of FIG. 7, at an earlier stage of fabrication.

FIG. 9 illustrates this schematically. It actually represents a partial section view of the MFP layer, parallel to the mean plane of one of the layers 110, 120. It notably shows two microchannels 123, 124, whose sections decrease as they spread towards edge surface 310. It further shows various cutting/dicing marks 410, 412, 420. Cutting can be for example carried out using a blade, a microtome, a dicing or sawing tool.

The edge surface 310 can hence be cut or ablated along any of the marks 420, and along any pair of marks 410, 412, resulting in various possible aperture sizes at the end of the microchannels. Reference numerals 121', 122' denote apertures as of before cutting.

In addition, the relative distance between microchannels 123, 124 changes too, whereby the relative distance between apertures as of after cutting can be adjusted as well.

Figure 10:
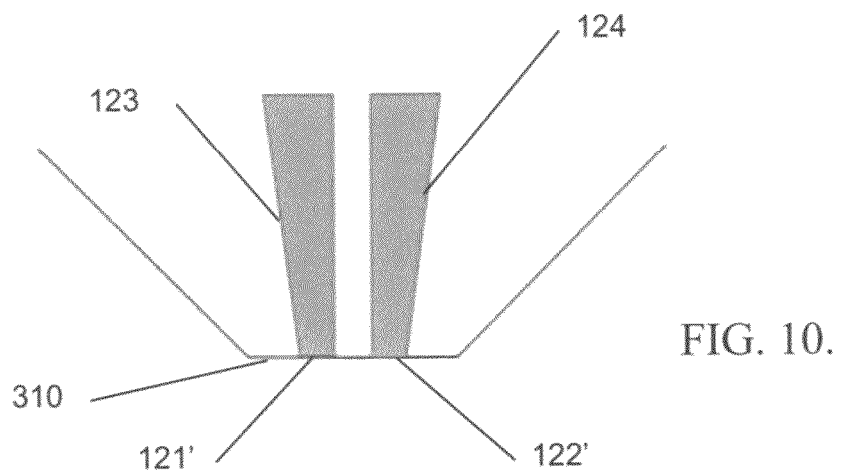
FIGS. 10-11 illustrate variants of the shapes of the microchannels in the MFP head of FIG. 9.

In an alternative embodiment, only the dimensions of the apertures are adjusted by cutting the edge surface, as depicted in FIG. 10. Here, the shape of the sections of the microchannels 123, 124 is designed such that cutting the edge will primarily result in modifying the apertures size, while not substantially modifying their relative distance. A further variant would consist in solely adjusting the distance between apertures, while not modifying their dimensions.

Figure 11:
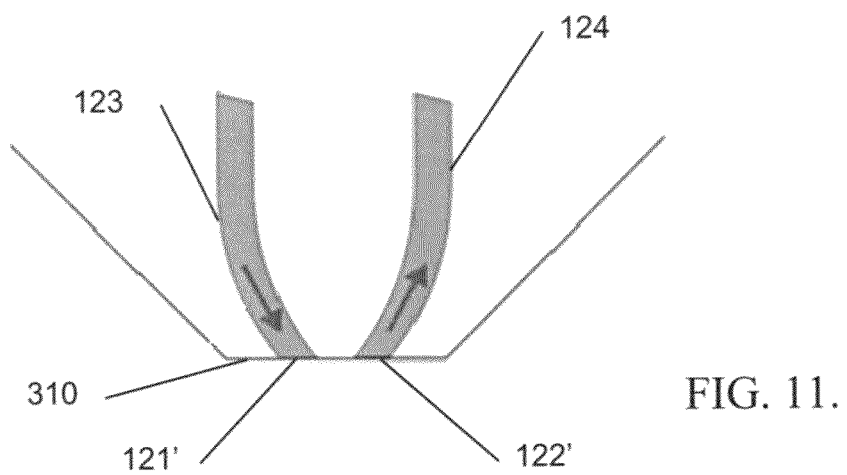

Even, microchannels 123, 124 can be engraved such as to present a curvature at the level of the edge surface 310, as illustrated in FIG. 11. Here, cutting the edge 310 would result in modifying the angle of incidence of the apertures. Hence, the angle of incidence of the fluid with respect to a sample surface can be modified. This notably impacts the momentum of liquid ejected from and aspirated by the apertures, which may be useful in some applications.

More generally, one or more microchannels can be fabricated parallel to the upper face of the second layer 120, extending up to the edge 310, such that one characteristic thereof (or more) is changed along the microchannel. As described above, this characteristic could be a relative distance between microchannels, the orientation of flares of the microchannels or a mix thereof. As a result, cutting the edge 310 allows for adjusting characteristics of apertures 121, 122 at the end of the microchannels 123, 124.

From the production point of view, this is advantageous inasmuch as only one design template for MFP layers 110, 120 can actually serve as a basis for obtaining various different final arrangements of apertures in MFP heads.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims. For example, while embodiments described above merely describe a MFP head having two ports, two vias, two apertures, etc., it may be embodied as a head having only one port, one microchannel and one aperture only. More generally, one or several sets of port, microchannel, etc., can be contemplated.

The invention claimed is:

1. A multilayer microfluidic probe head, comprising:
a first layer, a second layer, and a first tubing port extending from an upper face of the first layer, wherein:
the first layer has a first via enabling fluid communication between the first port and a lower face of the first layer;
the second layer comprises:
a first aperture on a face thereof;
and a first microchannel enabling fluid communication between an upper face of the second layer, facing the lower face of the first layer, and the first aperture; and
the head is further configured to enable fluid communication between the first via and the first micro channel, wherein:
at least a portion of the first microchannel is a groove open on the upper face of the second layer, and closed by a portion of a lower face of a layer of the head, and wherein the microfluidic probe head further comprises a second tubing port, a second via, a second aperture and a second micro channel, configured similarly as the first tubing port, the first via, the first aperture and the first microchannel;
the head being further configured to:
enable distinct fluid communications between the first via and the first aperture on the one hand, and between the second via and the second aperture on the other hand; and
to allow for aspirating at one of the apertures some fluid deposited via the other aperture on a surface close to the apertures.

2. The microfluidic probe head of claim 1, wherein the at least a portion of the first microchannel is a groove closed by a portion of the lower face of the first layer.

3. The microfluidic probe head of claim 1, wherein the first aperture extends through the second layer, from the lower face toward the upper face thereof, as a through hole.

4. The microfluidic probe head of claim 1, wherein at least a portion of the first microchannel is a groove extending up to the first aperture, the aperture formed at an end of the groove at the level of an edge of the upper face of the second layer.

5. The microfluidic probe head of claim 1, wherein a characteristic of the first microchannel changes along the mean direction thereof, preferably continuously.

6. The microfluidic probe head of claim 1, further comprising one or more windows provided in at least one of the first and the second layer.

7. The microfluidic probe head of claim 6, wherein:
the one or more windows are provided in the second layer; and
the first layer is preferably transparent.

8. The microfluidic probe head of claim 1, further comprising a transparent third layer between the first and second layer, the head further configured to enable fluid communication between the first via and the first micro channel, through the third layer.

9. The microfluidic probe head of claim 1, wherein the apertures have shapes, dimensions and relative position, which are defined to allow for hydrodynamic flow confinement of a liquid over the surface.

\* \* \* \* \*